United States Patent Office.

MORITZ MARCUS, OF NEW YORK, N. Y.

Letters Patent No. 102,567, dated May 3, 1870.

IMPROVED STREET-MOISTENING COMPOUND.

The Schedule referred to in these Letters Patent and making part of the same.

*To all whom it may concern:*

Be it known that I, MORITZ MARCUS, of the city, county and State of New York, have invented a new and improved Street-moistening Compound; and I do hereby declare that the following is a full, clear, and exact description thereof, which will enable others skilled in the art to make and use the same.

This invention has for its object the production of a substance by which the paved streets in cities and towns can be kept clean, and whereby the air in such streets will be purified, and greater health insured.

The invention consists in compounding the following ingredients in about the proportions set forth, to wit:

One part of alum; sixteen parts of chlorate of soda; sixteen parts of chloride of calcium; sixty-four parts of water.

The first three ingredients are dissolved in water, and the whole mixture is then sprinkled over the street. The several salts have the property of attracting and absorbing moisture. They serve, therefore, to keep the streets moist for a long time, and to lay the dust, and also to absorb moisture from the atmosphere, thereby keeping the same pure. When dry, the mixture becomes very hard, and protects and hardens the pavement.

Having thus described my invention,

I claim as new and desire to secure by Letters Patent—

The street-sprinkling compound herein set forth.

The above specification of my invention signed by me this 10th day of November, 1869.

MORITZ MARCUS.

Witnesses:
A. V. BRIESEN,
GEO. W. MABEE.